INVENTORS
SAMUEL GREENBERG
ABE JACOBS
DAVIS B. NORTHNAGEL
BY
Max R. Millman
ATTORNEY Sept. 15, 1970          S. GREENBERG ET AL          3,528,132

APPARATUS FOR MOLDING PLASTIC COPINGS AND SIMILAR ARTICLES

Filed Sept. 3, 1968          5 Sheets-Sheet 3

INVENTOR.
SAMUEL GREENBERG
ABE JACOBS
BY DAVIS B. NORTHNAGEL

*Max R. Millman*

United States Patent Office 3,528,132
Patented Sept. 15, 1970

3,528,132
APPARATUS FOR MOLDING PLASTIC COPINGS AND SIMILAR ARTICLES
Samuel Greenberg, Philadelphia, Pa. (Stump Road and Commerce Drive, Montgomeryville, Pa. 18936), and Abe Jacobs, Philadelphia, and Davis B. Northnagel, Green Lane, Pa.; said Jacobs and Northnagel assignors to said Samuel Greenberg, Philadelphia, Pa.
Filed Sept. 3, 1968, Ser. No. 756,750
Int. Cl. B29c 17/00
U.S. Cl. 18—19    11 Claims

ABSTRACT OF THE DISCLOSURE

Apparatus for molding copings, full models, teeth guards, and medicament applicators of plastic in which the desired male mold is removably mounted in a holder, a plastic sheet is mounted in another holder above the mold and means are provided to automatically effect a timed sequence in which the plastic sheet is first heated to softness, the soft sheet is then lowered onto the male mold, positive air pressure alone or in conjunction with vacuum is applied until the article is molded or formed, the air pressure is released, the plastic sheet holder is raised and the molded article then removed for cutting and trimming.

---

This invention relates to the molding or forming of dental members of plastic, the primary object of which is to accomplish the molding either by the dentist himself or in a dental laboratory efficiently, accurately, automatically, and with a minimum of manipulative skills.

Another object of the invention is to provide apparatus of the character described which is versatile in that the holder of the male molds can be interchanged to accommodate different molds such as waxing copings, transfer copings, full models of teeth or mouth, teeth guards, medicament applicators and the like.

Another object of the invention is to provide apparatus of the character described which is versatile in that the timing cycle for the application of heat to the plastic sheet, the application of pressure and/or vacuum to the sheet over the male mold and the withdrawal of the formed plastic from the male mold can be readily varied by dial settings to accommodate different kinds and thicknesses of plastic sheets. The entire unit is compact and contains all of the controls.

Another object of the invention is to provide apparatus of the character described which is versatile in that a plurality of plastic members may be molded or formed simultaneously.

Another object of the invention is to provide apparatus of the character described in which a closer adaptation of the plastic to the male mold can be obtained and which possesses the additional advantage in that the molding operation may be observed throughout.

These and other objects of the invention will become more apparent as the following description proceeds in conjunction with the accompanying drawings, wherein.

Specific reference is now made to the drawings in which similar reference characters are used for corresponding elements throughout.

The present apparatus is one in which plastic waxing copings, transfer copings, full models of teeth, splints, guards, medicament applicators and the like articles can be readily and easily molded by simply setting a dial and pressing a button which sets into timed sequence the application of heat to the plastic, the lowering of the plastic onto the male molds, the application of air and/or vacuum to form the plastic accurately around the male molds, the withdrawal of the air and/or vacuum, and the raising of the formed plastic member from the male molds or various combinations of the foregoing steps as will appear hereinafter.

Figure 1:
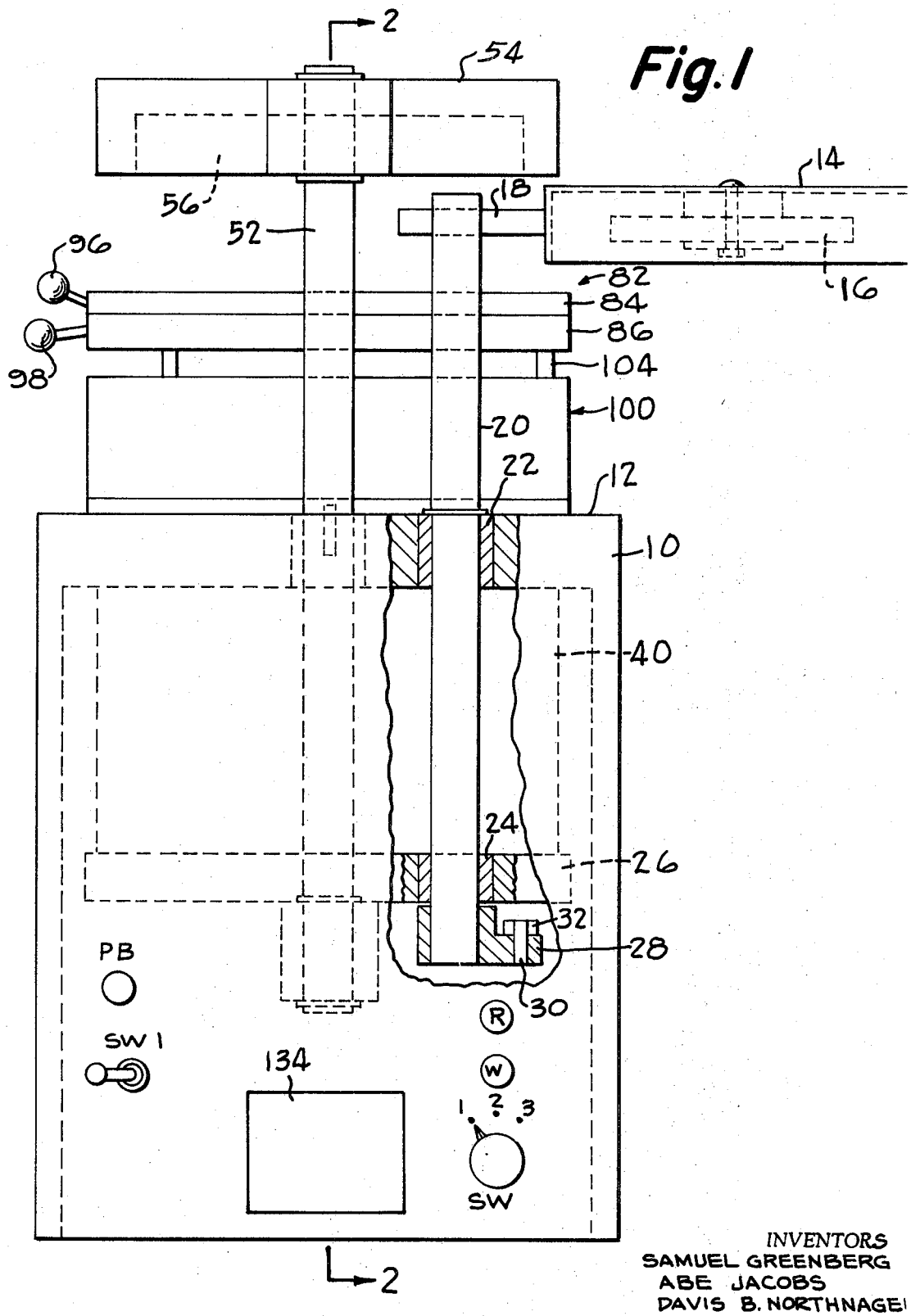
FIG. 1 is a side elevational view of the apparatus with parts broken away and in section to disclose details of construction.
Figure 2:
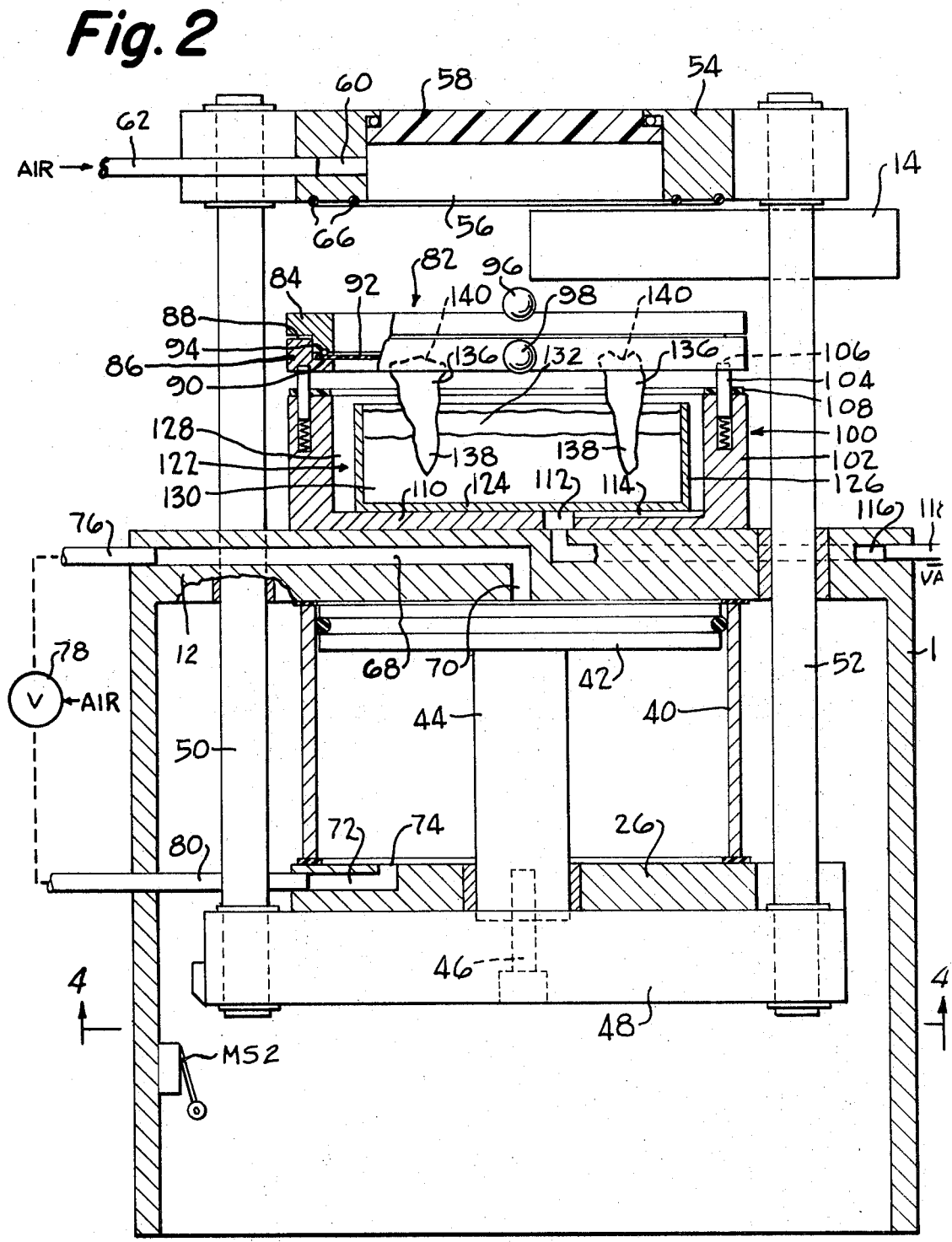
FIG. 2 is a sectional view taken on the line 2—2 of FIG. 1.
Figure 3:
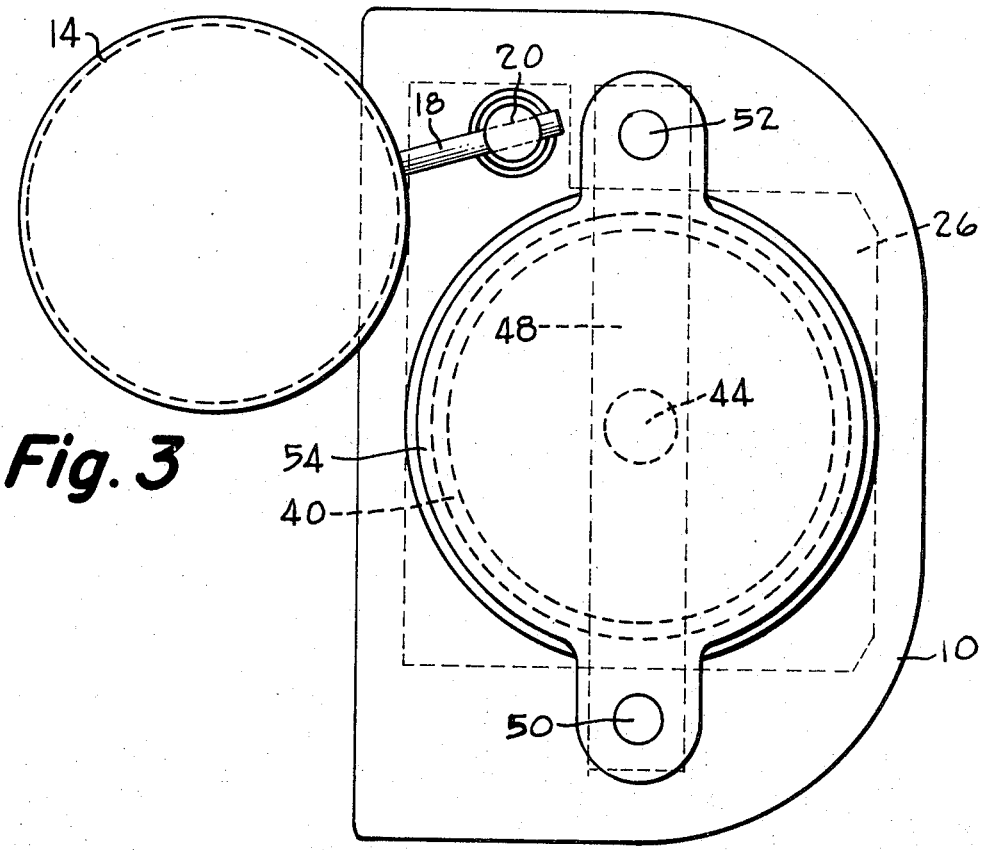
FIG. 3 is a top plan view of the apparatus.
Figure 4:
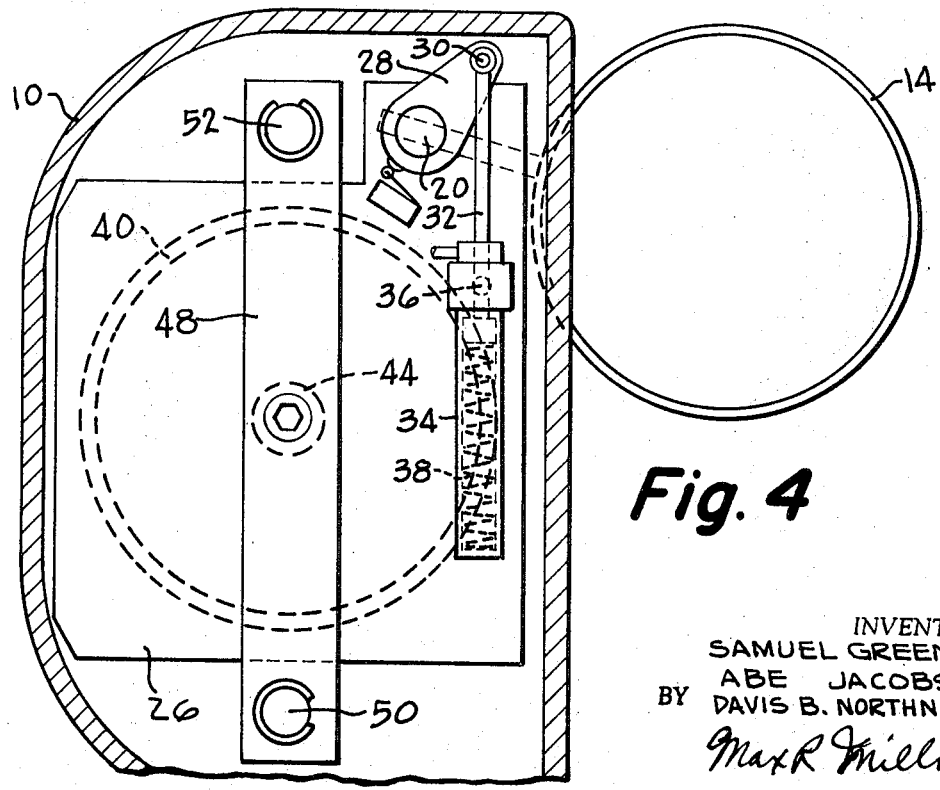
FIG. 4 is a sectional view taken on the line 4—4 of FIG. 2.

Referring first to FIGS. 1–4, the apparatus comprises a hollow base member having a peripheral wall 10 which is open on its bottom and includes an upper wall 12. A heater 14, preferably disk-shaped with a coil heating element 16 at its undersurface is provided which is pinned by an arm 18 upon the upper end of a post 20 which extends through and is rotatably journaled in the wall 12 as at 22. The lower end of the post also extends through and is journaled as at 24 in a base plate 26. Pinned to the post is a lever 28 which is in turn pivotally attached as at 30 to the end of a piston rod 32 which extends slidably into a cylinder 34 which is in turn pivotally secured as at 36, see FIG. 4, to the undersurface of the base plate 26. A spring 38 in the cylinder acts on the piston end of the rod 32 so that when compressed air is exhausted from the cylinder and the rod is in its extended position, the heater 14 is swung out of the way into an inoperative position as shown in FIGS. 1, 3 and 4 and when compressed air (source not shown) is admitted into the cylinder via solenoid valve 39 and the rod is retracted, the heater is swung into place in an operative position above the upper wall 12.

The base plate 26 is the bottom wall of a cylinder 40 whose upper wall is wall 12. A piston 42 is mounted on a rod 44 for sliding movement in the cylinder, the rod 44 extending slidably through a bushed opening in the lower wall 26 and being secured as at 46 to a cross-bar 48. The bottom wall 26 of the cylinder bears against the cross bar 48 and the latter at its ends is secured to a pair of posts 50 and 52 which extend slidably through bushed openings in the wall 12. At their upper ends, the posts 50 and 52 are secured to a manifold or dome member 54 in the general form of a disk-like plate having a bottom opening, cavity-forming recess 56, a viewing window 58 thereabove, and a laterally extending port 60 communicative with the cavity 56 which connects via a conduit 62 to a source of compressed air (not shown) via a solenoid valve 64. The bottom surface of the manifold 54 is provided with a sealing means 66.

The upper wall 12 is provided with a lateral passageway 68 which terminates in an opening 70 into the cylinder 40 above the piston 42. Another lateral passageway 72 is provided in the lower wall 26 which terminates in an opening 74 into the cylinder 40 below the piston. The passageway 68 is connected by a suitable conduit 76 to one side of a four-port solenoid valve 78 while the passageway 72 is connected to the other side of the valve 78 by a suitable conduit 80, the valve being operatively connected to the compressed air source. Thus the piston 42 and the manifold or dome 54 connected therewith can be raised and lowered by the selective admission of air into conduits 76 and 80.

A holder 82 for plastic disks to be formed into the desired copings, models, splints, etc. is provided which comprises essentially two rings 84 and 86. In vertical cross-section, the rings are of mating step section as shown at 88 thus providing an annular ledge 90, see FIG 2, in the lower ring 84 upon which a plastic disk 92 is mounted and held tightly in place when the upper ring 84 is made to engage the lower ring 86, the upper ring carrying a sealing member 94 which presses against the disk. Thus the disk extends across the opening centrally of the rings. The disks are provided with knobbed handles 96 and 98.

A cup 100 is mounted on the upper surface of the wall 12, the annular wall 102 of which is of diameter approximating that of the rings 84 and 86. Through its upper surface extend circumferentially spaced spring-urged locating pins 104 which are adapted to enter recesses 106 in the lower surface of the lower ring 86, there being a sealing gasket 108 on the upper surface of the cup to engage the lower surface of the lower ring 86.

Figure 5:
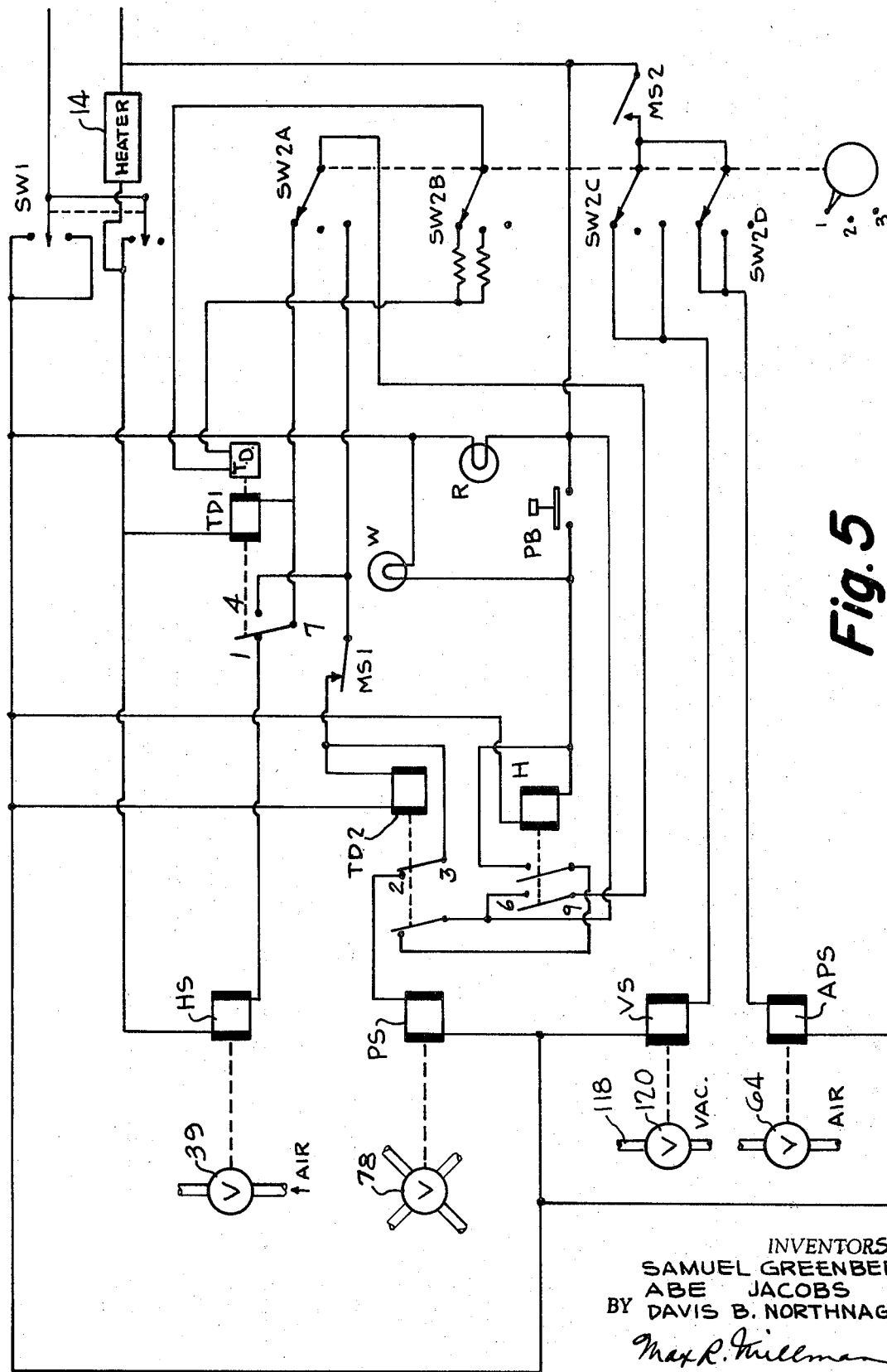
FIG. 5 is a wiring diagram of the control mechanism.

The bottom wall 110 of the cup which rests on the upper surface of the wall 12 includes a port 112 from which a radial groove 114 extends up to the annular wall 102. The port 112 communicates with a lateral passageway 116 in the wall 12 which connects by a conduit 118 to a solenoid valve 120 which is operatively connected to a source of vacuum (not shown), see FIG 5.

A second cup member 122 is placed removably in the first cup member and includes a bottom wall 124 which rests on the bottom wall 110 of the first cup and an annular wall 126 which is spaced inwardly of the annular wall 102 of the first cup as at 128. The cup 122 is nearly filled with a conventional dental molding compound 130 upon whose top surface is mounted a layer 132 of a resilient foam or sponge material.

It will be understood that the apparatus is compact in that the control circuit and its components will be mounted in the base member 10 below its upper wall. At desired locations on the outside of the annular wall of the base member there will be an operational instruction chart 134, a push-button switch PB, a selector switch SW, a red lamp R, a white lamp W and a toggle power-heater switch SW1, see FIG. 1.

Although a wide variety of products can be made by the instant invention, the operation will be described with reference to copings. After the dentist has taken an impression of a tooth, a male member or die 136 is made to conform thereto of conventional materials, such as metal, stone, epoxy, etc. The die has a tapered shank or stem portion 138 and an upper crown portion 140 corresponding to the impression taken by the dentist.

The die is inserted into the molding compound 130 through the sponge separator 132 with its crown portion 140 extending beyond the separator as shown in FIG. 2. A plurality of different dies may be inserted in the molding compound if desired.

A plastic disk 92 is then mounted on the ledge 90 of the lower ring 86 and the ring 84 is positioned thereover. The plastic holder unit is then mounted on the spring-urged locating pins 104 carried by the cup 100. The plastic disk used depends upon whether one desires to make a waxing coping, a transfer coping, a temporary splint, a base plate, an impression tray, a mouth guard or a medicament applicator and can be chosen from such materials as polyethylene, polystyrene, Alathon, an ethylene-vinylacetate copolymer made by Du Pont, Surlyn, an ionomer resin made by Du Pont, etc.

Figure 6:
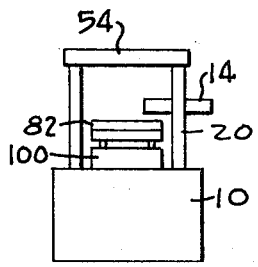
FIGS. 6–10 are diagrammatic views illustrating the sequential process steps.
Figure 7:
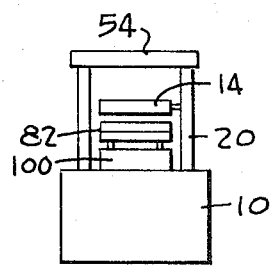

The operator throws the toggle switch SW1 to "on" position. In so doing, the current flows through heater 14 and the red lamp R lights up. After allowing sufficient time for the heater to stabilize, the operator sets the dial of the selector switch SW to the position given on the chart 134 for the desired product. He then depresses the push button PB and the white lamp W will light up. This also energizes relay H closing contacts 6 and 9, sending current through the particular selector position, then through the normal time delay contacts TD1 to energize heater solenoid HS and operate valve 39. This sends compressed air into the cylinder 34 to retract piston rod 32 and swing the heater 14 from the inoperative position shown in FIG. 6 to the operative position shown in FIG 7 over the plastic disk holder 82. At the same time the current applied to TD1 relay starts the timing period for the heater to be in the operative position, the resistor put into the circuit by turning the selector knob, see SW2B, will determine the time lapse.

Figure 8:
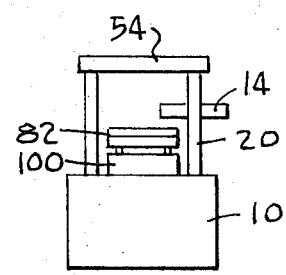

When TD1 relay times out and operates it opens normally closed contacts 1 and 7 causing the heater solenoid HS to turn valve 39 so that compressed air is exhausted from the cylinder 34 whereupon the spring 38 causes the piston rod 32 to extend and through lever arm 28 swing the heater 14 back to its inoperative position as shown in FIG. 8.

Figure 9:
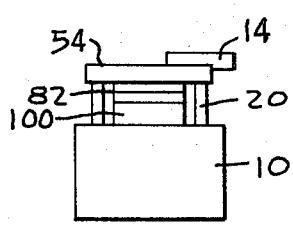

When the lever arm 28 is in this position microswitch MS1 closes and current flows through contacts 7 and 4 and microswitch MS1 to energize time delay relay TD2. Current then flows through normally closed contacts 2 and 3 to energize pressure solenoid PS. This operates valve 80 so that compressed air passes through conduit 76. passageway 68 and port 70 to push the piston 42 down and the manifold or dome 54 down against the upper disk 84 with the sealing means 66 engaging the upper surface of the disk as shown in FIG 9. This clamps down the plastic disk holder 82 causing the lower surface of the lower ring 86 to engage the gasket 108 on the upper surface of the cup 100 and the plastic disk 92 to engage the crowns of the male dies 136.

When the dome 54 is down microswitch MS2 closes causing current to flow either through selector switch SW2C or SW2D or both to energize the air pressure solenoid APS and/or the vacuum solenoid VS. This causes valve 64 to open and compressed air flows through conduit 62 and passageway 60 into chamber 56 of the dome pushing down on the plastic disk 92 against and around the crowns 140 of the dies 136. If vacuum is also employed, alone or in combination with air pressure, valve 120 will open and air will be drawn out of passageway 116, port 112 and the annular space 128 around the cup 122 acting to pull the disk 92 firmly against the dies.

Figure 10:
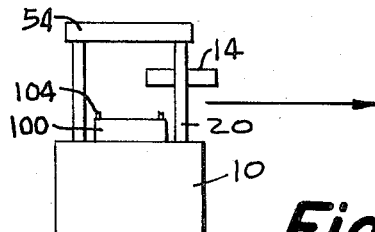

When time delay relay TD2 times out microswitch MS2 opens de-energizing vacuum and air pressure solenoids VS and APS and closing the vacuum valve 120 and air pressure valve 64. At the same time contacts 2 and 3 will open releasing pressure solenoid PS to actuate valve 80 so that air flows through conduit 80, passageway 72 and port 74 beneath the piston 42, while air is exhausted from conduit 76 and passageway 68 to thus raise the dome 54 to its original position as shown in FIG. 10. This will also de-energize relay H extinguishing the white lamp W and restoring the circuit to normal.

Figure 11:
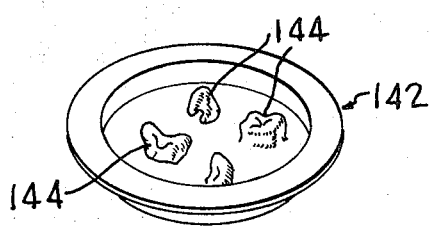
FIG. 11 is a perspective view of a molded member as taken from the apparatus shown formed with various copings.
Figure 12:
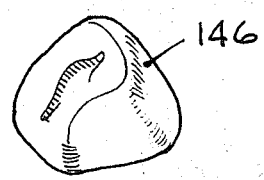
FIG. 12 is a perspective view of a coping cut from the disk in which it was formed.

The plastic holder 82 is then removed from the apparatus, the disks 84 and 86 separated and the molded plastic disk 142 removed. The raised molded portions 144, see FIG. 11, are the copings corresponding to the crowns 140 and when trimmed produce the final coping 146, see FIG. 12.

While several selector positions have been illustrated, it will be understood that different positions and corresponding circuitry can be provided to supply different automatic operations. In practice, it is contemplated that selector positions 1–12 would provide air pressure plus vacuum plus variable heat times. Additional selector positions 13 and 14 will supply vacuum alone plus heat which will vary for two positions. A 15th selector position will supply heat plus air pressure alone and one pre-set heat time and a 16th selector position will supply only air pressure without heat or vacuum.

In practice it has been found that air pressure combined with vacuum provides optimum molding results for a wide variety of items. The order of magnitude of the air pressure is 60 p.s.i. and of the vacuum 28–29 in. If desired air pressure alone plus heat can be used to make copings, splints, and trays. Without heat, air pressure alone may be employed to condense products, such as porcelain-water mixtures. The air pressure may also be varied.

Figure 13:
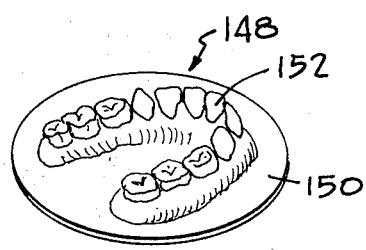
FIG. 13 is a perspective view of a full model of a set of teeth or splint as taken from the apparatus.

As an illustration of a different type of product other than copings which can be made by the instant invention, attention is called to FIG. 13 which shows an untrimmed model, temporary splint or guard 148 as it comes out of the apparatus. The peripheral flat untrimmed portion 150 corresponds to the unmolded flat disk as it went into the holder 82 and the female raised portion 152 is that molded against a male model of the teeth which has been mounted in the cup or carriage 126. The male model or die can be pushed into the molding compound 130 to the desired depth or into a desired pre-formed cavity therein. The layer of foam or sponge 132 is not used except possibly as a washer in this application; and if it is not used at all a lubricant, such as a silicone spray, will be used instead to allow for separation of the formed plastic disk and the die.

Figure 14:
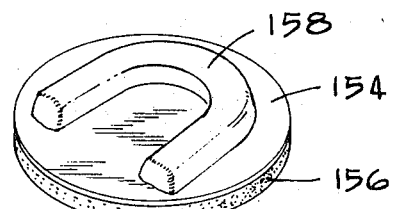
FIG. 14 is a perspective view of a horseshoe-shaped channel member useful as a medicament carrier as taken from the apparatus.

Similarly a medicament applicator can be made in the apparatus by providing a horseshoe or oval-shaped male die which is placed in a pre-formed cavity in the molding compound 130 and sprayed with an appropriate lubricant. In place of a single layer of plastic for use as the disk 92, a disk comprising a laminate of a layer of impervious plastic 154 and a layer of open or closed cell from 156 is placed in the holder 82 and retained between the rings 84 and 86. Thus when one completes the heating and air-vacuum cycle, as described above, a unit such as that shown in FIG. 14 will be formed with a raised horseshoe shaped portion 158 which when trimmed away will be a medicament, i.e. fluoride, applicator of channel form having an inner foam layer 156 and an outer impervious layer 154. The apparatus can also be used to make a similar medicament tray not of a laminate but of a closed cell foam per se. When the male die is an oval, the final formed product will be cut transversely in half to form two trays of the type shown in FIG. 14.

Thus by merely mounting a die member in the molding compound of the cup or carriage 122, by selecting the proper position on the dial of the selector switch SW to correspond with the chart 134 and by depressing the push button PB, one can form a variety of dental products, automatically and with great accuracy. It should be understood that while the push button PB, the toggle switch SW1, the selector switch SW, the lamps R and W and the indicator chart 134 are shown in FIG. 1 as being on the side of the device, in actuality they will be located at the front thereof. While a preferred embodiment has here been shown and described, it will be understood that minor variations may be made by skilled artisans without departing from the spirit of the invention and the scope of the appended claims.

We claim:

1. Apparatus for forming plastic dental copings, splints, guards and the like comprising a receptacle including a pliable material to removably retain male dies, a holder to removably retain a plastic sheet, resilient means mounting said holder above said receptacle, a heater, means to move said heater into an operative position above the holder for a predetermined time necessary to soften the plastic sheet and then out of the way into an inoperative position, a dome, means to reciprocate said dome into and out of contact with said holder, said dome acting to compress said resilient means and cause the plastic sheet to engage the male dies when it contacts said holder, and means to apply air pressure for a predetermined time through said dome onto the softened plasic sheet to mold it around the dies after which the air pressure is released and the dome is moved by said reciprocating means out of contact with said holder for access to the molded plastic sheet removably retained therein.

2. The combination of claim 1 and means to apply vacuum to the plastic sheet simultaneously with the application of air pressure thereon.

3. The combination of claim 1 and electrical control means having circuitry including selector switches, time delay relays and solenoid valves for moving said heater, reciprocating said dome and applying and releasing the air pressure in timed sequence.

4. The combination of claim 2 and electrical control means having circuitry including selector switches, time delay relays and solenoid valves for moving said heater, reciprocating said dome and applying and releasing the air pressure and the vacuum in timed sequence.

5. The combination of claim 4 and a housing enclosing said control means, said housing including an upper wall upon which is mounted said receptacle, holder, dome and heater to provide a compact unit.

6. The combination of claim 5 wherein said holder comprises a pair of upper and lower mating rings, the plastic sheet being retained between the rings.

7. The combination of claim 6 wherein said resilient means mounting said holder above said receptacle includes a cup receiving said receptacle and spring-urged pins carried by said cup and extending above its upper edge engaging said lower ring.

8. The combination of claim 5 wherein said means to move said heater includes a post rotatably journaled on said housing wall and mounting said heater above said wall, a lever arm secured to said post in said housing and pneumatic means in said housing operatively connected to said control means reactive on said lever arm to rotate said post so that said heater is moved first into the operative position above the holder and then into the inoperative position away from the holder.

9. The combination of claim 5 wherein said dome is a disk-like member including a recess which closes on contact with said holder to form an air chamber immediately above the plastic sheet.

10. The combination of claim 9 wherein said means to reciprocate said dome includes posts securing said dome at their upper ends and extending slidably through said housing, wall, a cross bar in said housing joining the lower ends of said posts, a cylinder in said housing between said housing wall and said cross bar including a piston and a piston rod secured to said cross bar, said control means including valved air pressure means to selectively deliver compressed air above the piston to move said dome down against said holder and to deliver compressed air beneath said piston to raise said dome out of contact with said holder.

11. The combination of claim 5 including a cup mounted on said housing wall receiving said receptacle, a passageway in said housing wall communicative with a valved conduit leading to a vacuum source, said passageway terminating in a port in the bottom wall of said cup beneath said receptacle and a groove in the bottom wall of said cup extending to the peripheral wall of said cup, which peripheral wall is spaced from the peripheral wall of said receptacle to provide a free path for the applied vacuum to reach the plastic sheet in said holder.

References Cited

UNITED STATES PATENTS

| | | |
|---|---|---|
| 2,691,798 | 10/1954 | Winchester et al. |
| 2,832,094 | 4/1958 | Groth. |
| 2,837,855 | 6/1958 | Hoke. |
| 3,235,387 | 12/1965 | Angilello et al. |
| 3,235,639 | 2/1966 | Knowles. |
| 3,255,992 | 6/1966 | Kersten _____ 18—5.7 |
| 3,377,656 | 4/1968 | Tilden. |
| 3,443,627 | 5/1969 | Watts. |

WILLIAM J. STEPHENSON, Primary Examiner